United States Patent [19]

Gement

[11] Patent Number: 5,492,407
[45] Date of Patent: Feb. 20, 1996

[54] CHAMBER FOR TREATING WASTES AND REMOVING THE TREATED WASTES FOLLOWING TREATMENT

[76] Inventor: Paul Gement, 1920 Woodvine St., Mandeville, La. 70448

[21] Appl. No.: 306,140

[22] Filed: Sep. 14, 1994

[51] Int. Cl.$^6$ ........................................... B01F 9/06
[52] U.S. Cl. ........................... 366/228; 366/147; 366/233
[58] Field of Search ................................. 366/220, 222, 366/223, 225, 226, 227, 228, 229, 139, 144, 147, 148, 149, 53, 56, 57, 58, 59, 24, 25, 233

[56] References Cited

U.S. PATENT DOCUMENTS

| | | | |
|---|---|---|---|
| 918,749 | 4/1909 | Hommel | 366/139 |
| 1,867,541 | 7/1932 | Shellabarger | 366/228 |
| 2,797,070 | 6/1957 | Winn, Jr. et al. | 259/3 |
| 3,088,711 | 5/1963 | Phillips | 259/3 |
| 3,147,956 | 8/1964 | Phillips | 259/30 |
| 3,901,411 | 8/1975 | Bauman | 222/167 |
| 4,828,397 | 5/1989 | Egretier | 366/184 |
| 5,017,016 | 5/1991 | Nasu | 366/139 |
| 5,104,232 | 4/1992 | Lennox, III | 366/227 |

Primary Examiner—Robert W. Jenkins
Attorney, Agent, or Firm—Pravel, Hewitt, Kimball & Krieger

[57] ABSTRACT

An improved heating chamber for wastes, of the type utilized to subject the wastes within the chamber to steam, the chamber comprising a substantially cylindrical body portion, having a continuous sidewall, and first and second end portions, and defining a waste receiving space therewithin. The chamber is provided with a steam inlet line for allowing steam to be injected into the chamber, and a water outlet line for removing water from the chamber through vacuum or the like; there is further provided a base for allowing the chamber to rotate during the cleaning process. The chamber provides a hinged lid along the wall, for allowing wastes to be placed within the chamber and removed therefrom. Further, there is provided a pair of mixing vanes along an inner wall of the chamber, each of the vanes extending from a point substantially adjacent the central opening, and spiralling toward the first and second ends of the chamber, so that after the chamber is filled with wastes, the chamber is rotated in a direction so that the vanes carry the waste toward each first and second end of the chamber resulting in a single level of wastes in the chamber as it is being rotated during steam cleaning.

18 Claims, 5 Drawing Sheets

CHAMBER FOR TREATING WASTES AND REMOVING THE TREATED WASTES FOLLOWING TREATMENT

BACKGROUND OF THE INVENTION

1. Field of the Invention

The present invention relates to treatment of waste materials for disposal. More particularly, the present invention relates to an improved chamber for treating cellulose-containing wastes within a rotating chamber, with steam under pressure, the configuration of the chamber providing for even distribution of wastes within the chamber during treatment and easy removal of wastes from the chamber following treatment.

2. General Background

Treatment and disposal of wastes, such as household wastes, which include a large quantity of paper or cellulose-containing products, is an ongoing problem in our society. In a method invented by the present inventor, for which an application is presently pending, a portion of the overall method included heat treating the waste stream with steam within a pressurized chamber. The chamber would then be heated to dry the cellulose to a desired moisture content. The waste would be removed from the chamber (or autoclave) and separated into its various components.

One of the drawbacks to the system was the construction of the chambers which utilized to heat treat and dry the cellulose within the waste stream. The chamber as disclosed required that an internal cylindrical chamber be housed within an external chamber and receive the wastes via a conveyor belt through a side door at the end of the chamber. The inner chamber would then be rotated, with steam being injected under pressure. Any moisture in the steam-treated wastes would then be removed via a vacuum, and the wastes would again be transported out of the chamber via the conveyor to be separated into the requisite components.

Although this type of heating chamber did provide a pulp product which had been sufficiently exposed to steam heat and subsequently dried, the chamber within a chamber concept was rather expensive and required an elaborate operation to achieve its desired results. It would be a savings in time and expense if a more efficient chamber could be developed so that the system could be improved. A search of pertinent art was undertaken and the results are outlined in the accompanying prior art statement.

SUMMARY OF THE PRESENT INVENTION

The system of the present invention solves the problems in a simple and straightforward manner. What is provided is an improved heating chamber for wastes, which contain a high percentage of cellulose fiber, wherein the wastes within the chamber are subjected to a flow of steam; the chamber comprising a substantially cylindrical body portion, having a continuous sidewall, and first and second end portions, and defining a waste receiving space therewithin. The chamber is provided with a steam inlet line for allowing steam to be injected into the chamber, and a water outlet line for removing water from the chamber through vacuum or the like. There is further provided a base for allowing the chamber to rotate during the cleaning process, and a heating element for maintaining the chamber heated during rotation of the chamber. The chamber provides a central opening along the wall, for allowing wastes to be placed within the chamber and removed therefrom. The opening can be sealed off by a hinged lid member. Further, there is provided a pair of vane members along an inner surface of the chamber wall, each of the vanes extending from a point substantially adjacent the central opening, and spiralling toward the first and second ends of the chamber. After the chamber is filled with wastes, the lid member is sealed shut, and the chamber is rotated in a first direction so that the vanes distribute the wastes toward each first and second end of the chamber, resulting in a single level of wastes in the chamber as it is being rotated during steam cleaning. Steam is injected under pressure so that the wastes are heat-treated to a preselected degree. The steam is then interrupted, and a vacuum is drawn on the chamber space, removing most of the moisture from the treated wastes. Following these steps, the chamber is rotated in the opposite direction, so that the wastes are moved to the center of the chamber, and as the central opening rotates to the bottom position, the wastes are deposited through the central opening via gravity into a collection hopper or the like.

During the entire process the chamber may be subjected to external heat from a burner in order to maintain a desired temperature within the chamber. Further, there are provided weight cells so that the reduction in moisture content in the chamber can be monitored as a function of the loss of weight of the wastes in the chamber.

In another embodiment, the chamber could be utilized as a simple mixing chamber, for example, compost material, where the material would be mixed through rotation of the chamber, but would not require injection of steam, and would not require pressurization of the chamber during the mixing process.

Therefore, it is a principal object of the present invention to provide an improved heating chamber for wastes which allow for even distribution of wastes within the chamber during the treatment cycle, and movement of the wastes to the central opening in the chamber when the cleaning is completed;

It is a further principal object of the present invention to provide a chamber for cleaning wastes which allow wastes to be deposited within the chamber through a central opening, steam cleaned, dried, and removed from the central opening following the cleaning and drying process;

It is a further object of the present invention to provide an improved waste cleaning and drying chamber which provides for even distribution of the wastes in the chamber as the chamber is rotated in one direction, and provides for movement of the dried wastes to be deposited from the chamber through the central opening when the chamber is moved in the opposite direction;

It is a further object of the present invention to provide a method to monitor the amount of moisture removed from the weight following the steam treatment of the waste, as a function in the overall reduction in weight of the wastes within the chamber.

It is a further object of the present invention to provide a mixing chamber for mixing material, whereby the material would be mixed through rotation of the chamber, but would not require injection of steam, and would not require pressurization of the chamber during the mixing process.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
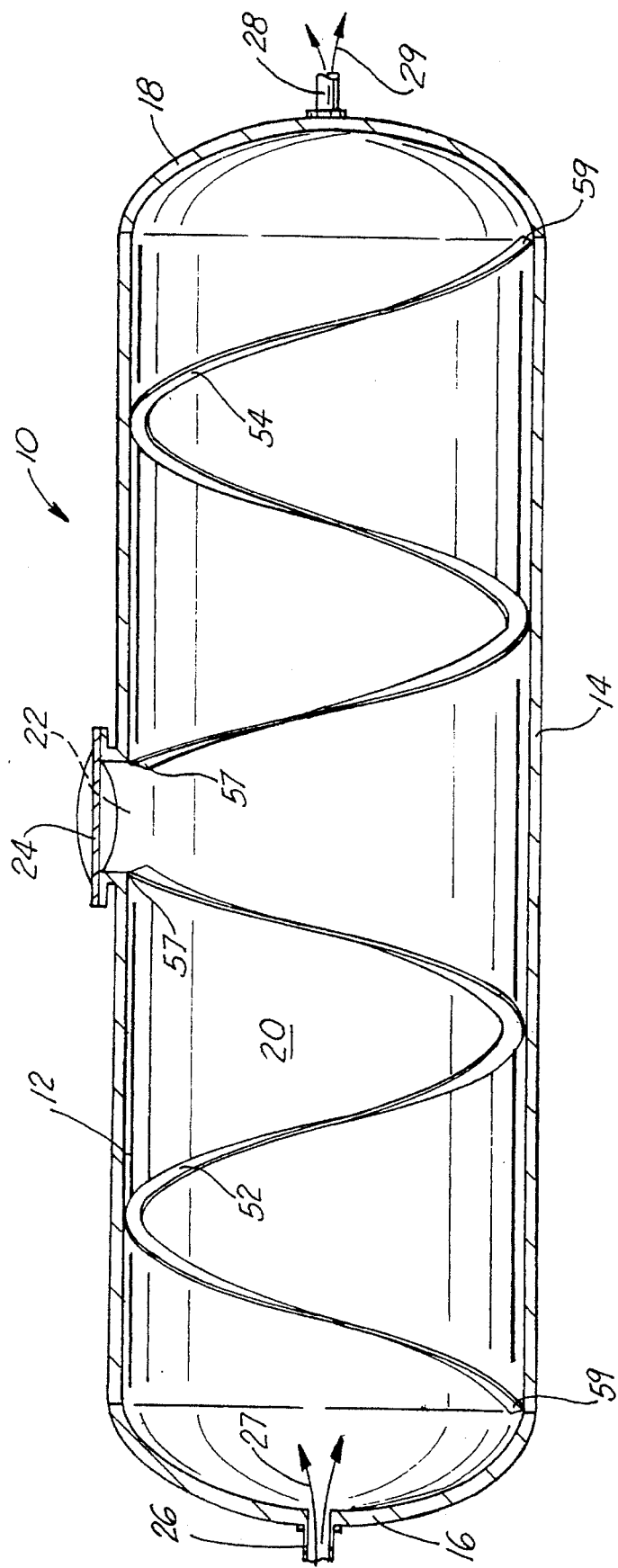
FIG. 1 illustrates a cross-sectional view of the preferred embodiment of the chamber of the present invention.

FIGS. 1 through 6 illustrate the preferred embodiment of the present invention by the numeral 10. As illustrated in the Figures, improved mixing chamber 10 comprises a substantially cylindrical body portion 12, having a continuous sidewall 14, and a first rounded end 16, and a second rounded end 18. The sidewall 14 and first and second ends 16, 18 all define an interior chamber space 20 therein. As illustrated, during operation, chamber 10 is substantially horizontally disposed, as will be described further.

As seen in the figures, particularly FIG. 1, chamber 10 further comprises a capped opening 22, opening 22 positioned substantially equidistant between end portions 16, 18, and including a lid member 24, for sealing off the chamber space 20 during operation. There is further provided a first entry line 26, entering the first end 16 of chamber space 20, for injecting a heated fluid, such as steam or water, (via arrows 27) into chamber space 20. A vent line 28 is provided on the second end 18 of chamber space 20 for removal of any fluid or moisture from chamber space 20, through suction or the like, to a desired moisture content, as indicated by arrows 29.

As illustrated further in the figures, chamber 10 would be positioned upon a means for imparting rotation to chamber 10 during the cleaning operation. In the preferred embodiment, this means would comprises a system of rollers 30 positioned adjacent each end 16, 18 of the chamber 10. Each of the system of rollers 30 would include at least a first roller 32, and a second roller 34, each roller 32, 34 making contact with the chamber wall 14, and supporting the chamber thereupon as seen in end view in FIG. 2. Each of the roller systems 30 would be driven by drive motors 36, 37 which would be synchronized to rotate the chamber 10 in the directions of arrows 38, 40, depending on the direction of rotation desired. As seen further in FIG. 2, there may be provided a means to automatically close and open the lid member 24, this means comprising a hydraulically operated lifting system 25, having a support frame 31, and a hydraulic lifting arm 33 connected at its end 35 to the lid 24 for automatically lifting the lid from chamber 10 and returning lid 24 into position for sealing the chamber.

Figure 2:
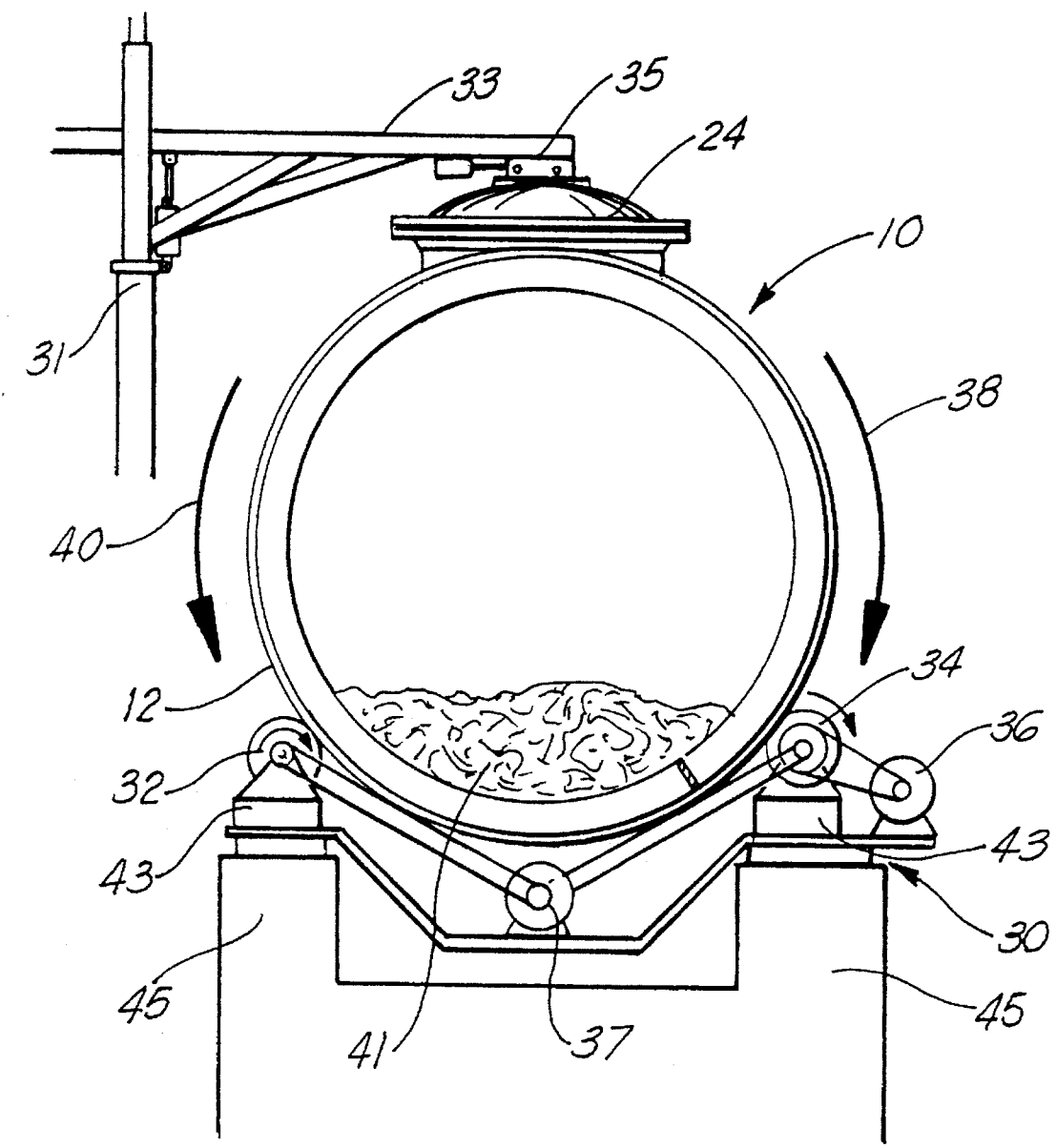
FIG. 2 illustrates an end view of the preferred embodiment of the chamber of the present invention.
Figure 3:
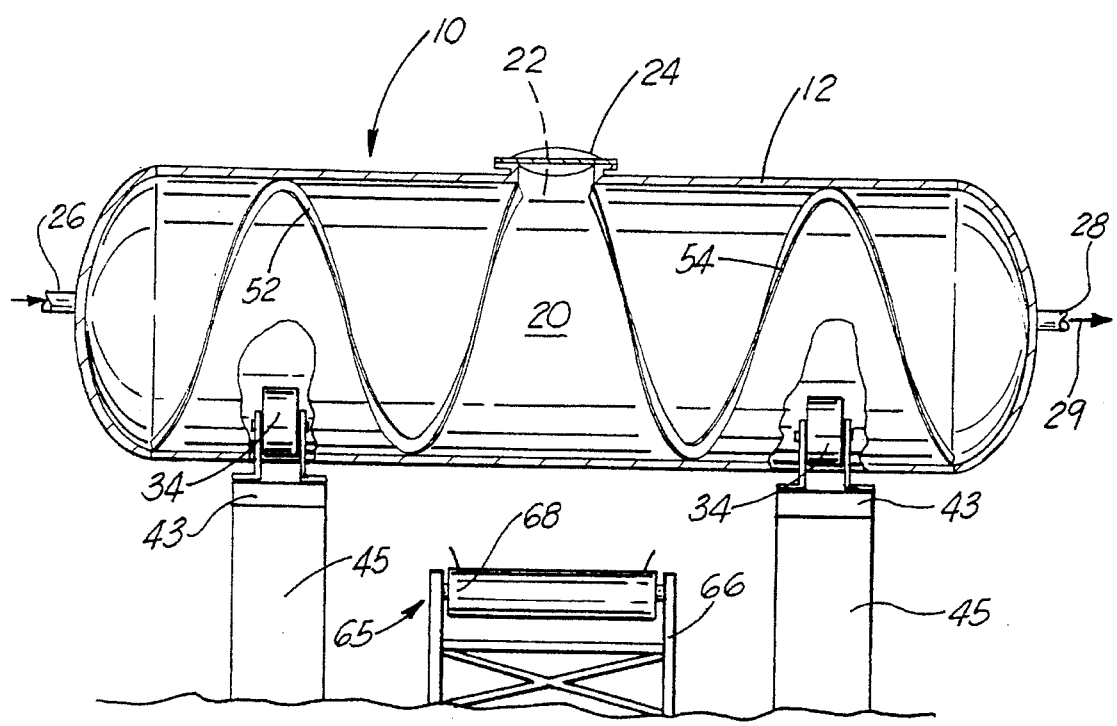
FIG. 3 illustrates a side cross-sectional view of the preferred embodiment of the chamber of the present invention mounted on a support structure.

There is further provided in FIG. 2 a means to record the weight of the waste material 41 when it is first placed in chamber 10, and the weight of the material 41 within the chamber 10 following heating and treatment so as to determine the loss of moisture during the drying operation. This means would include weight cells 43 positioned upon support beams 45, so that each of the roller systems 32, 34, would record the given weight, and the change in the weight during the process. Weight cells 43 are of the type known in the industry and would be utilized in the manner provided. Weight cells 43 would help provide a concise reading of the amount of moisture removed and enable one to calculate the percentage of moisture remaining in the waste material following treatment.

Figure 4:
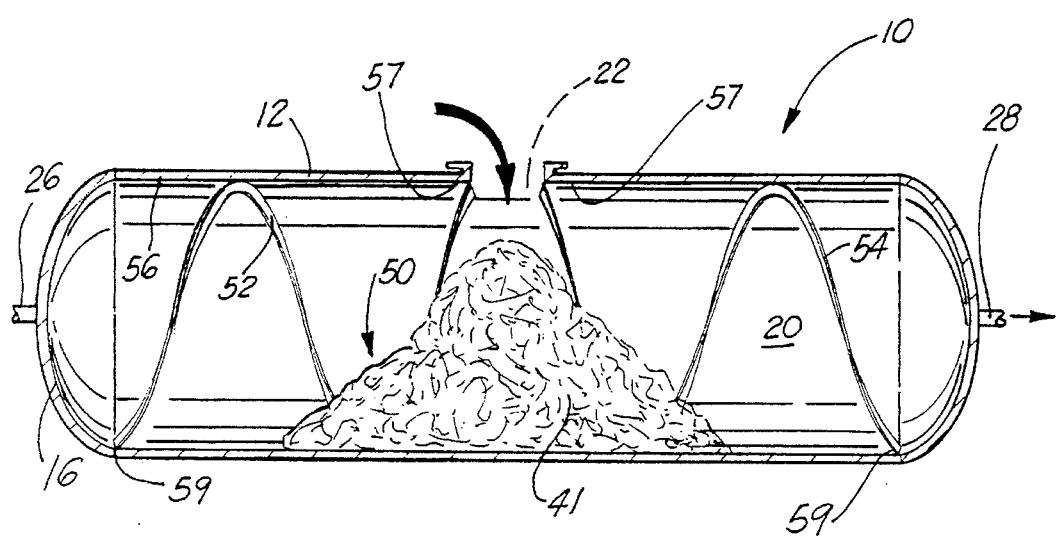
FIG. 4 illustrates a side internal view of the chamber of the present invention receiving the materials to be treated in the chamber.

Another critical feature in the improved chamber 10 is the means for moving the waste materials contained within the chamber space 20. As seen in FIG. 4, during operation, the waste material 41, comprising pulp wastes, such as paper and products containing cellulose, would be deposited into the chamber space 20 through central opening 22, when the lid 24 is placed in the open position. This movement of waste 41 into the chamber through the opening 22 may be automated, or may be done manually.

The wastes, after being deposited within chamber space 20 would rest in a waste heap 50 within chamber space 20, as seen in FIG. 4. In order to evenly distribute waste heap 50 evenly along chamber space 20, so that the cleaning process may proceed, the means for distributing the waste is defined by at least two vanes 52, 54. The first vane 52 is of a specific height, and would spiral along the inner surface 56 of chamber wall 12, in a spiraling effect, extending from the central portion 57 of chamber wall 56, adjacent the opening 22, to a point 59 adjacent the first end 16 of chamber 10. Likewise, the second vane 54 is of the same specific height as vane 52, and would likewise spiral from point 57 adjacent opening 22, along the inner wall 56 of chamber wall 12, and would extend from the central portion of chamber wall 56, adjacent the opening 22, to a point 59 adjacent the second end 18 of chamber 10. This configuration is also clearly illustrated in FIG. 3.

Figure 5:
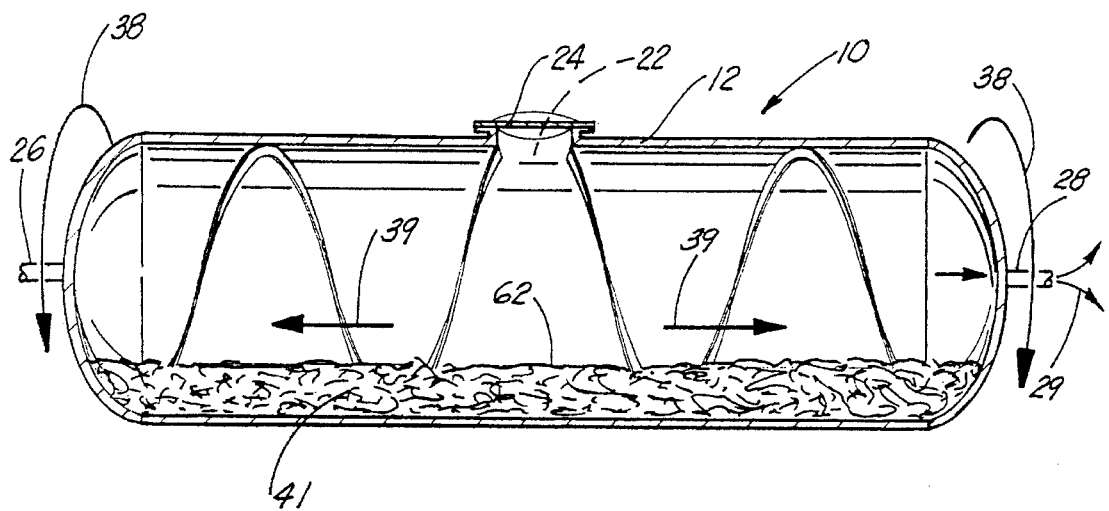
FIG. 5 illustrates a side internal view of the chamber of the present invention during treatment of the materials as the chamber is being rotated.

Following the depositing of the wastes into the chamber space 20, the lid 24 would be sealed shut, as seen in FIG. 5, and the chamber 10 would be rotated via the roller systems 30 in a first direction, as indicated by arrows 38. This first direction as seen in FIG. 5, and shown by the arrows 38, would provide that the vanes 52, 54 would engage the waste heap and distribute the waste material along the entire inner space 20 of chamber 10, along arrows 39, to a specific height 62, as seen in side view in FIG. 5. Experiments show that as long as the chamber 10 is rotated in that first direction, the waste 41 will remain in the distribution along the bottom of chamber 10 as illustrated. At that time, the chamber space 20 would be subjected to the steam or heated water under pressure via entry line 26, and the waste would be cleaned within the chamber 10 and rotated to achieve maximum surface contact with the boiling water or steam. There could be provisions for heat being applied to the chamber to maintain a preselected internal temperature within chamber space 20 to assure complete cleaning of the wastes and the cellulose material.

Following the cleaning cycle, as also seen in FIG. 5, the steam line 26 would be closed, and the second vent line 28 would be activated so that a suction is applied to the space 20 within the chamber 10, and all liquid and moisture within the chamber space 20 would be removed, (arrows 29) and the material 41 be allowed to dry to a preselected moisture-free state. As was stated earlier, the amount of moisture in the wastes remaining after suctioning is a function of the loss in the weight of the chamber as recorded by the weight cells 43.

Figure 6:
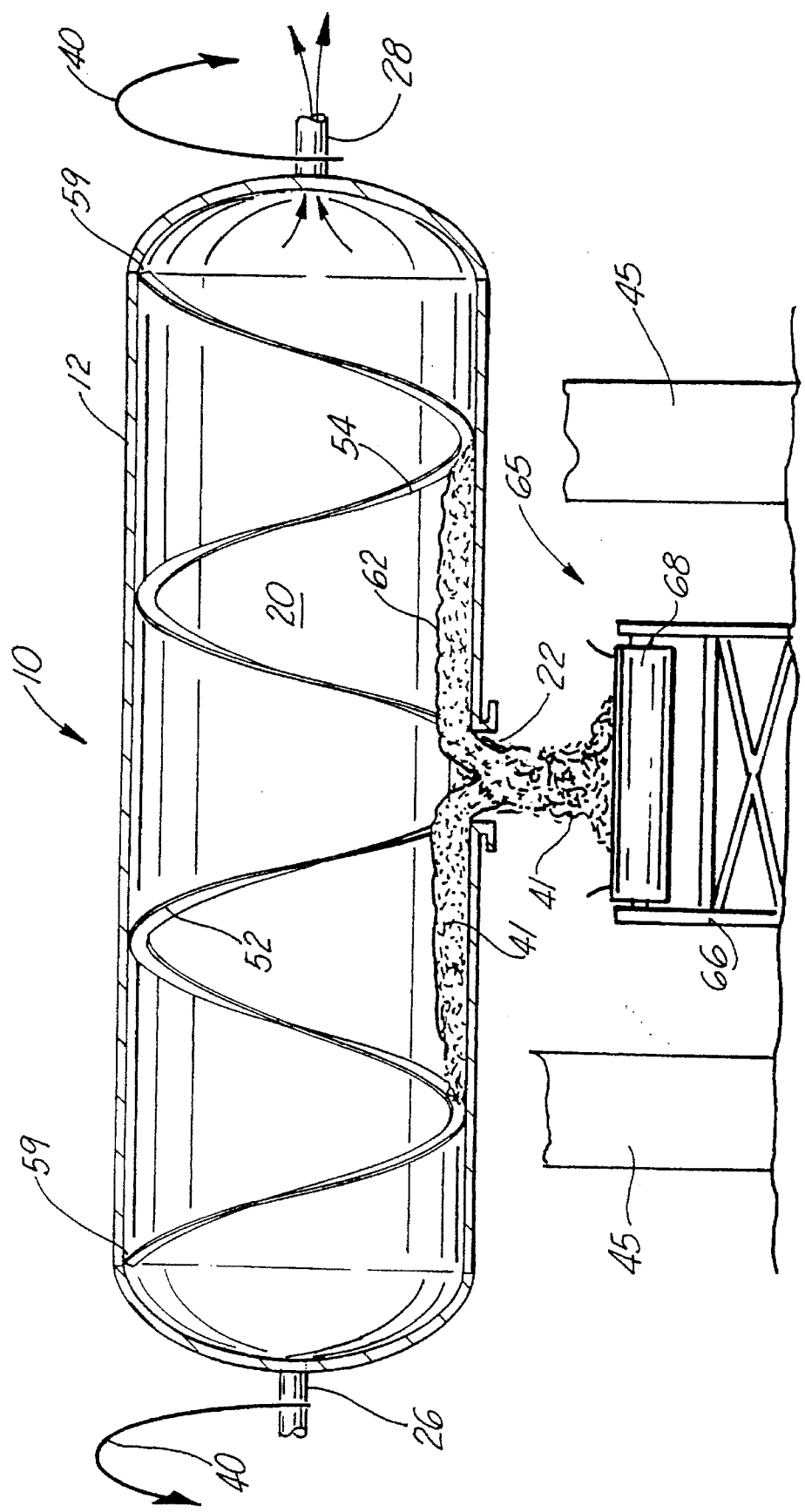
FIG. 6 illustrates a side internal view of the chamber of the present invention following treatment of the materials in the chamber, and the treated materials being removed therefrom.

After the material in the chamber 10 is dried to a predetermined moisture content, the chamber space 20 would then be rotated in a second direction, shown by arrows 40 in FIG. 6, by rollers 32, 34 of roller system 30. At this time, the waste material 41, which was evenly distributed during the rotation in the first direction, would then be moved to the center of the chamber space 20 during rotation in the second direction. At this point the lid 24 to central opening 22 is raised, and a portion of the wastes 41 have been moved to a point adjacent the opening 22, so that when the chamber 10 is rotated, and the chamber opening 22 reaches a position at the bottom of its travel path, a portion of the waste 41 will be deposited, via gravity, through opening 22 onto a conveyor system 65. Conveyor system 65 would include a support frame 66, and a continuous belt 68, of the type that could be utilized as a screen for sorting out the material from the chamber according to size. The material would then be conveyed for further treatment or packaging. Each rotation of the chamber 10, around one path will move more waste 41 to a point adjacent opening 22, and deposit more waste from the inner space 20 of chamber 10. Experiments have shown that after approximately 10 revolutions of the chamber, all of the waste within chamber space 20 will have been deposited from the chamber space 20. The chamber 10 would then be ready to receive a second quantity of waste 41 to be treated as previously described.

In the preferred embodiment each chamber 10 would be approximately 40 feet in length and 12 feet in diameter. Each of the veins 52, 54 would be approximately 1 foot in height spiraled along the inner surface 56 of wall 12. Experiments have further shown that in order to achieve the level distribution of waste 41 within chamber space 20 during rotation in the first direction, the level of the material would be higher than the one foot height of the vanes, after the material has been distributed evenly along the length of the chamber space 20. For purposes of practicality, there would be provided several chambers 10, working in tandem, so that while one chamber 10 is in the cleaning cycle, the second chamber 10 could be unloading cleaned wastes. Therefore, a continuous cycle of cleaning and unloading of wastes could be achieved with this process, Additionally, it is foreseen that the chamber could be constructed to meet AMSE standards so that the chamber could be pressurized for the steam-treating process as discussed. Alternatively, the chamber could be used an unpressurized mixing chamber, utilizing the principles as discussed for mixing and distributing products such as compost or the like.

The following table lists the part numbers and part descriptions as used herein and in the drawings attached hereto.

Glossary of Terms mixing chamber 10
body portion 12
sidewall 14
first end 16
second end 18
chamber space 20
opening 22
lid member 24
lifting system 25
entry line 26
arrows 27, 29
vent line 28
roller system 30
support frame 31
first roller 32
lifting arm 33
second roller 34
end 35
drive motors 36, 37
arrows 38, 39, 40
waste material 41
means 42
weight cells 43
beams 45
waste heap 50
first vane 52
second vane 54
inner surface 56
portion 57
point 59
height 62
conveyor system 65
continuous belt 68

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved chamber, comprising:

a. a substantially cylindrically shaped body with first and second end portions, defining a chamber space therewithin;

b. an opening in the chamber wall for receiving wastes into and depositing wastes therefrom;

c. means for rotating the chamber in first and second directions while the wastes are within the chamber;

d. vane means positioned along an inner side of the chamber wall within the chamber space, so that when the chamber is rotated in the first direction, wastes within the chamber travel from the center of the chamber and are distributed substantially evenly throughout the length of the chamber, and when the chamber is rotated in the second direction, the wastes travel from the even distribution within the chamber space to the central portion of the chamber, so that the wastes may be deposited from the chamber space through the central opening as the opening moves to the lower point in its travel path during rotation; and e. means for injecting steam or hot water into the chamber space under pressure during cleaning.

2. The chamber in claim 1, further comprising means to apply heat to the chamber during the cleaning process.

3. The chamber in claim 1, further comprising means to remove moisture from the chamber following the cleaning process.

4. The chamber in claim 1, further comprising automated means to deposit waste materials into the chamber space through the central opening.

5. The chamber in claim 1, wherein the central opening further comprises a hinged lid sealable over the opening during the cleaning process.

6. The chamber in claim 1, wherein during rotation in the second direction, the vanes carry the wastes to the central point in the chamber space adjacent the central opening.

7. The chamber in claim 1, wherein the central opening provides a means, when open following the cleaning process, to allow cleaned wastes to flow from the chamber space via gravity when the opening is at the lower wall of the chamber during rotation in the second direction.

8. An improved cleaning chamber, comprising:
   a) a generally cylindrical chamber body, having a continuous sidewall and first and second end portions, all defining a chamber space therewithin;
   b) a central opening in the chamber wall for depositing wastes into and removing wastes from the chamber space;
   c) a first vane along an inner surface of the sidewall within the chamber space, the vane extending from a point adjacent the central chamber opening to the first end of the chamber;
   d) a second vane spiraling along the inner surface of the sidewall within the chamber space, the vane likewise extending from a point adjacent the central chamber opening to the second end of the chamber;
   e) means for rotating the chamber in a first direction so that the wastes within the chamber is moved to the first and second ends of the chamber by the first and second spiralling vanes, so that the wastes are evenly distributed within the chamber during cleaning;
   f) means for rotating the chamber in a second direction so that the wastes within the chamber are moved to the center of the chamber by the first and second spiralling vanes to be deposited through the central opening following the cleaning process; and
   g) means to inject steam or hot water into the chamber space under pressure during cleaning.

9. The chamber in claim 8, further comprising means to apply heat to the chamber during the cleaning process.

10. The chamber in claim 9, further comprising means to remove moisture from the chamber following the cleaning process.

11. The chamber in claim 8, further comprising automated means to deposit waste materials into the chamber space through the central opening.

12. The chamber in claim 8, wherein the central opening further comprises a hinged lid sealable over the opening during the cleaning process.

13. The chamber in claim 8, further comprising weight cell means for calculating the initial weight of the weight in the chamber, the weight of the material with steam during treatment, and the weight of the material in the chamber after treatment to determine the percentage of moisture remaining in the waste.

14. An improved waste-treatment chamber, comprising:
   a) a generally cylindrical horizontally-disposed chamber body, having a continuous sidewall and first and second end portions, all defining a chamber space therewithin;
   b) an central opening in the chamber wall for depositing wastes into and removing wastes from the chamber space;
   c) a first vane spiraling along an inner surface of the sidewall within the chamber space, the vane extending from a point adjacent the central chamber opening to the first end of the chamber;
   d) a second vane spiraling along the inner surface of the sidewall within the chamber space, the vane likewise extending from a point adjacent the central chamber opening to the second end of the chamber;
   e) means for rotating the chamber in a first direction so that the wastes within the chamber are moved to the first and second ends of the chamber by the first and second spiralling vanes, and are evenly distributed within the chamber during cleaning;
   f) means for injecting steam or heated water into the chamber under pressure to clean the wastes within the chamber;
   g) means for rotating the chamber in a second direction so that, following the cleaning process, the wastes within the chamber are moved to the center of the chamber by the first and second spiralling vanes, to be deposited through the central opening.

15. The chamber in claim 14, further comprising means for suctioning off any excess moisture to attain a preselected moisture content of the wastes within the chamber.

16. The chamber in claim 14, further comprising weight cell means for calculating the initial weight of the waste in the chamber, the weight of the material with steam during treatment, and the weight of the material in the chamber after treatment to determine the percentage of moisture remaining in the waste.

17. The chamber in claim 14, wherein the chamber may be utilized as a mixing chamber without injection of steam under pressure.

18. A method of distributing wastes within a treatment vessel, comprising the following steps:
   a. providing a cylindrically-shaped vessel body, having a continuous sidewall, and a central opening into an internal vessel space;
   b. providing a first vane means within the internal vessel space, said vane means extending along an inner surface of said vessel wall from a point adjacent the central opening to a first end of the vessel space;
   c. providing a second vane means within the internal vessel space, said vane means extending along an inner surface of said vessel wall from a point adjacent the central opening to a second end of the vessel space;
   d. inserting a quantity of cellulose-containing waste through the central opening into the internal vessel space;
   e. sealing the central opening;
   f. rotating the vessel in a first direction so that the quantity of waste within the internal vessel space are distributed by the first and second vanes along a substantially level layer throughout the length of the vessel space;
   g. subjecting the internal vessel space to steam or other heated fluid to treat the waste within the vessel space;
   h. removing a predetermined quantity of moisture from the waste within the vessel space through vacuuming of the like;
   i. opening the sealed lid and rotating the chamber in a second direction so that the evenly distributed wastes within the chamber are moved by the vanes to the center of the vessel to a point adjacent the central opening;
   j. rotating the central opening to a lower point so that the waste adjacent the opening exit the vessel space through the opening; and
   k. repeating step (j) until substantially all of the wastes have exited the vessel space through the opening.

* * * * *